(12) United States Patent
Arik et al.

(10) Patent No.: US 11,988,374 B1
(45) Date of Patent: May 21, 2024

(54) OPTICAL ARRANGEMENT FOR COLLIMATED LIGHT BEAM

(71) Applicant: OZYEGIN UNIVERSITESI, Istanbul (TR)

(72) Inventors: Mehmet Arik, Istanbul (TR); Mohammad Azarifar, Istanbul (TR); Ceren Cengiz, Istanbul (TR)

(73) Assignee: OZYEGIN UNIVERSITESI, Istanbul (TR)

( * ) Notice: Subject to any disclaimer, the term of this patent is extended or adjusted under 35 U.S.C. 154(b) by 0 days.

(21) Appl. No.: 18/283,496

(22) PCT Filed: Aug. 5, 2021

(86) PCT No.: PCT/TR2021/050775
§ 371 (c)(1),
(2) Date: Sep. 22, 2023

(87) PCT Pub. No.: WO2023/014308
PCT Pub. Date: Feb. 9, 2023

(51) Int. Cl.
*F21V 5/04* (2006.01)
*F21V 7/00* (2006.01)
*G02B 19/00* (2006.01)
*G02B 27/30* (2006.01)

(52) U.S. Cl.
CPC ............. *F21V 5/04* (2013.01); *F21V 7/0091* (2013.01); *G02B 19/0028* (2013.01); *G02B 27/30* (2013.01)

(58) Field of Classification Search
CPC ..... F21V 5/04; F21V 7/0091; G02B 19/0028; G02B 27/30
See application file for complete search history.

(56) References Cited

U.S. PATENT DOCUMENTS

| | | | |
|---|---|---|---|
| 7,473,013 B2* | 1/2009 | Shimada | F21K 9/69 362/329 |
| 8,371,710 B2* | 2/2013 | Gupta | F21V 5/04 362/187 |
| 2009/0231846 A1* | 9/2009 | Nakajima | G02B 6/003 362/237 |
| 2015/0070900 A1* | 3/2015 | Fleming | F21V 17/02 362/311.01 |

FOREIGN PATENT DOCUMENTS

| | | |
|---|---|---|
| CN | 107076388 A | 8/2017 |
| JP | 2018067535 A | 4/2018 |

* cited by examiner

*Primary Examiner* — Tracie Y Green
*Assistant Examiner* — Michael Chiang
(74) *Attorney, Agent, or Firm* — Bayramoglu Law Offices LLC (57) ABSTRACT

A lamp for producing a collimated light beam includes at least one light source disposed on a casing, a retaining plate having at least one opening for accommodating an optical assembly. The optical assembly includes an upper portion having a convex shaped lens, a bottom portion having an upper wall configured as a concave shaped lens and having an aperture. The optical assembly further includes an inverted dome shaped shell defined by lateral walls and a refractive wall and a domed portion having the convex shaped lens extending outwardly from the lamp.

20 Claims, 9 Drawing Sheets

OPTICAL ARRANGEMENT FOR COLLIMATED LIGHT BEAM

CROSS REFERENCE TO THE RELATED APPLICATIONS

This application is the national phase entry of International Application No. PCT/TR2021/050775, filed on Aug. 5, 2021, the entire contents of which are incorporated herein by reference.

TECHNICAL FIELD

The present invention relates to an optical device, more specifically to an optical assembly for producing light having a collimated beam.

BACKGROUND

The emergence of a high-power requirement in the lighting industry fuels advancements in illumination technologies. Lighting devices having a range of emission behaviors, such as directed, ornamental, linear are needed in the illumination market.

LEDs are the most advantageous lighting solution when compared to other items since they give dependability, efficiency, extended life, and good color quality.

A secondary optics is required to regulate virtually Lambertian light emission from a sole LED in order to use it for desired illumination objectives. MR16 lamps are designed to create concentrated beams to produce spotlights. An MR16 LED lamp with multifaceted reflector (MR) internal reflection (TIR) lens collimates light from the LED and produces a concentrated beam of light. Traditional MR16 lenses of the market come in a height of 6 mm or higher. Constant heat creation from multiple high-power LED chips, on the other hand, provokes excessive thermal loads that must be dissipated using an appropriate cooling system.

Enhanced optical and thermal control is necessary to achieve commercial successes in the package design of lighting products, specifically LEDs. Lenses are generally made up of UV stabilized clear polycarbonate material with low thermal conductivity of 0.19 to 0.22 W/m-K and the thermal effect of MR16 lens thickness is not well covered yet in the literature.

A new compact lens with a better optical and heat removal capabilities can extend current limits of light collimation devices.

OBJECTS OF THE INVENTION

A primary object of the present invention is to overcome the above-mentioned shortcomings of the prior art.

Improvements resulting from present invention are examined in by understanding the role of secondary optics in the opto-thermal characterization of LED packages.

A further object of the present invention is to propose a lamp which is also easy to constitute with low cost, which is easy to operate, which has a long service life, and easy to maintain by having a simple structure.

Still a further object of the invention is to provide a lamp and an optical assembly having maximized peak intensity and better thermal performance.

Other objects of the present invention will become apparent from accompanying drawings, brief descriptions of which follow in the next section as well as appended claims.

SUMMARY

The present invention proposes a lamp having an optical assembly that achieves improved light quality, extraction efficiency, and more uniform lateral beam angle.

Said lamp generally comprises at least one light source placed on a casing, a retaining plate having at least one opening for accommodating an optical assembly wherein said optical assembly includes an upper portion having a convex shaped lens and a bottom portion having an upper wall configured as an concave shaped lens. Said bottom portion includes an aperture being located on the top of the light source. Moreover, said optical assembly further comprises an inverted dome shaped shell side profile defined by lateral walls and a refractive wall and further includes a domed portion having the convex shaped lens which is extending outwardly from the lamp.

In a possible embodiment, the optical assembly has a height (H) between a top surface of the upper portion and a base of the bottom portion wherein said height is not lower than 2.8 mm and not higher than 4 mm. Thus, a lens with a volume that is 25% smaller than commercially available lenses can be produced, resulting in a cost advantage.

Another possible embodiment, the optical assembly is arranged for having a height between a top surface of the upper portion and a base of the bottom portion wherein said height is 3 mm. Since the optical assembly (e.g. lens) has a 50% thinner structure compared to available lens designs, more compact packaging designs, high lumen and better light quality controlled products can be attained.

In a possible embodiment, the concave and convex shaped lens are configured as conic lenses. Said conic lenses present solutions to optical issues that engender light rays to focus at numerous locations in the formation of an image and cause a blur.

In a possible embodiment, a curvature radius ratio ($r_1/r_2$) between the curvature radius ($r_1$) of the convex-shaped lens and the curvature radius ($r_2$) of the concave shaped lens is a value in a range of 1.7 to 1.9.

DETAILED DESCRIPTION OF THE EMBODIMENTS

Hereinafter, preferred embodiments of the present invention will be described in detail with reference to the accompanying drawings which are given solely for the purpose of exemplifying embodiments according to the present invention.

The list of reference numerals and letters used in the appended drawings are as follows;

1 Lamp
10 Optical assembly
  100 Concave shaped lens
  101 Upper portion
    1010 Top surface
  102 Inverted dome shaped shell
  103 Bottom portion
    1030 Base
  104 Lateral wall
  111 Domed portion
  113 Aperture
  114 Refractive wall
  123 Upper wall
  200 Convex shaped lens
12 Light source
13 Casing
14 Retaining plate
  141 Opening
$T_1$ Lateral rays
$T_2$ Lost rays
$H_1$ Height
$r_1$ Curvature radius of convex shaped lens
$r_2$ Curvature radius of inner collimation lens
+Y: Y axis of the Cartesian coordinate system The invention proposes a lamp (1) and an optical assembly (10) wherein the optical and thermal control are two main factors in the package design process of said invention.

Figure 1:
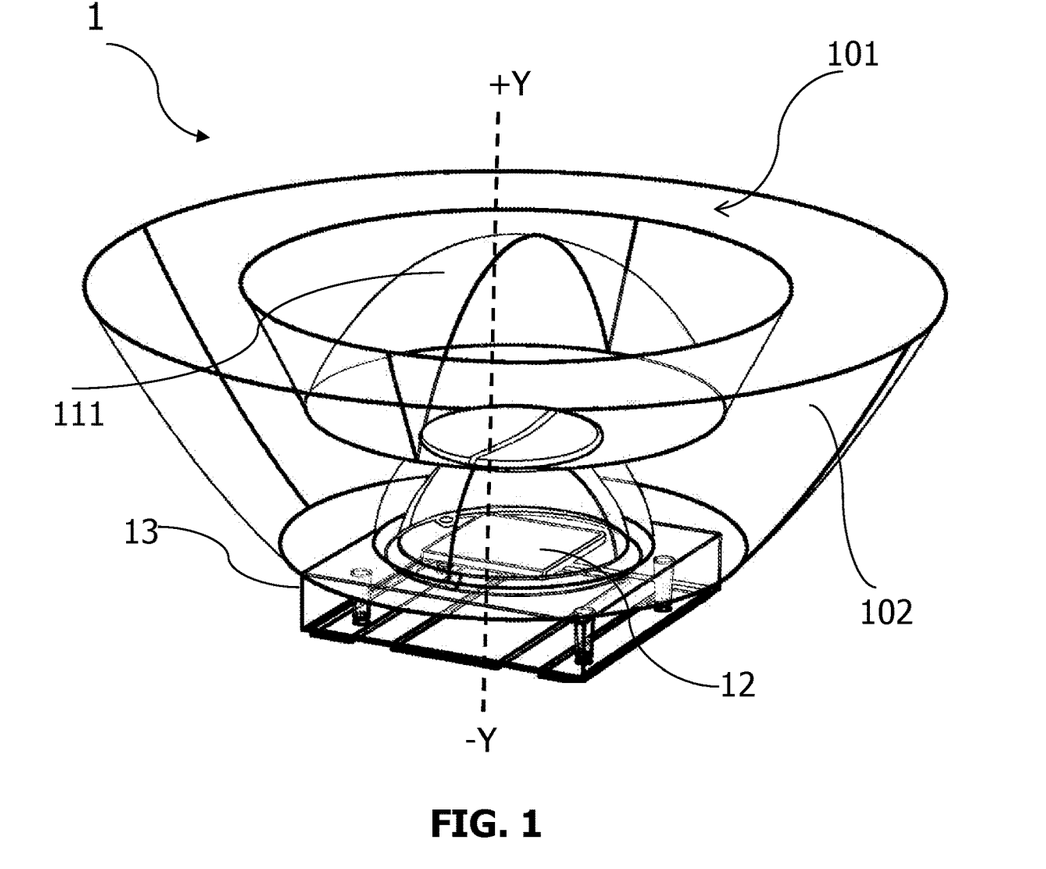
FIG. 1 illustrates a lamp comprising an optical assembly and a light source according to the present invention.
Figure 2:
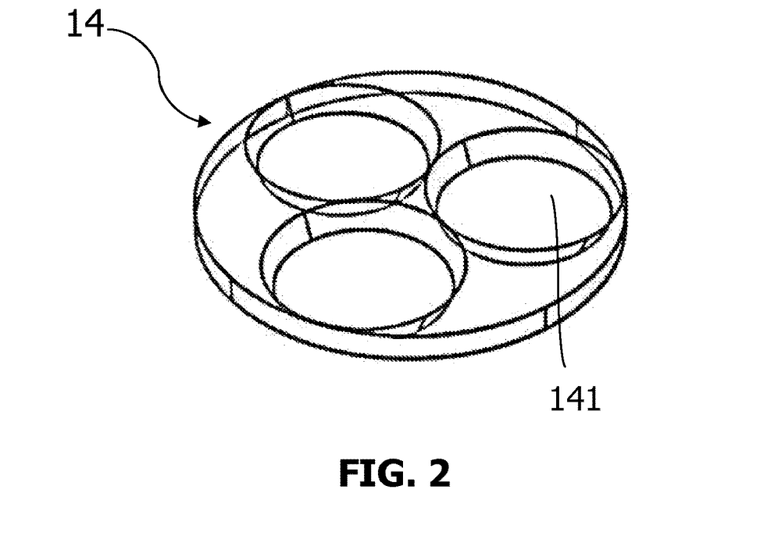
FIG. 2 illustrates a perspective view of a retaining plate according to the present invention.

As illustrated in FIGS. 1 and 2, the lamp (1) for producing a collimated light beam, comprises at least one light source (12) disposed on a casing (13), a retaining plate (14) having at least one opening (141) for accommodating an optical assembly (10), the optical assembly (10) including an upper portion (101) having a convex shaped lens (200), a bottom portion (103) having an upper wall (123) configured as a concave shaped lens (100) and having an aperture (113), said aperture (113) being located on top of the light source (12). As used herein the term "upper" refers to +y axis direction and the other term "bottom" refers to −y axis direction of the Cartesian coordinate system.

Figure 3:
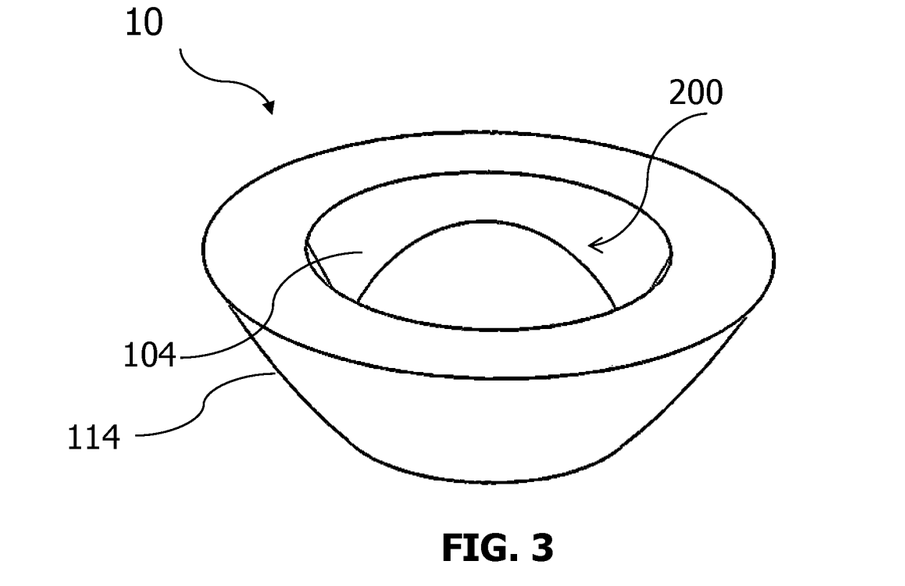
FIG. 3 illustrates a perspective view of the optical assembly comprising an inverted dome shaped shell and a convex shaped lens in accordance with an embodiment of the to the present invention.

As shown in FIG. 3, said optical assembly (10) further comprises an inverted dome shaped shell (102) defined by lateral walls (104) and a refractive wall (114). Moreover, said optical assembly (10) includes a domed portion (111) having the convex shaped lens (200) extending outwardly from the lamp (1). In a possible embodiment said upper portion (101) comprises a plurality of cutouts for providing cost-effective production.

Figure 4:
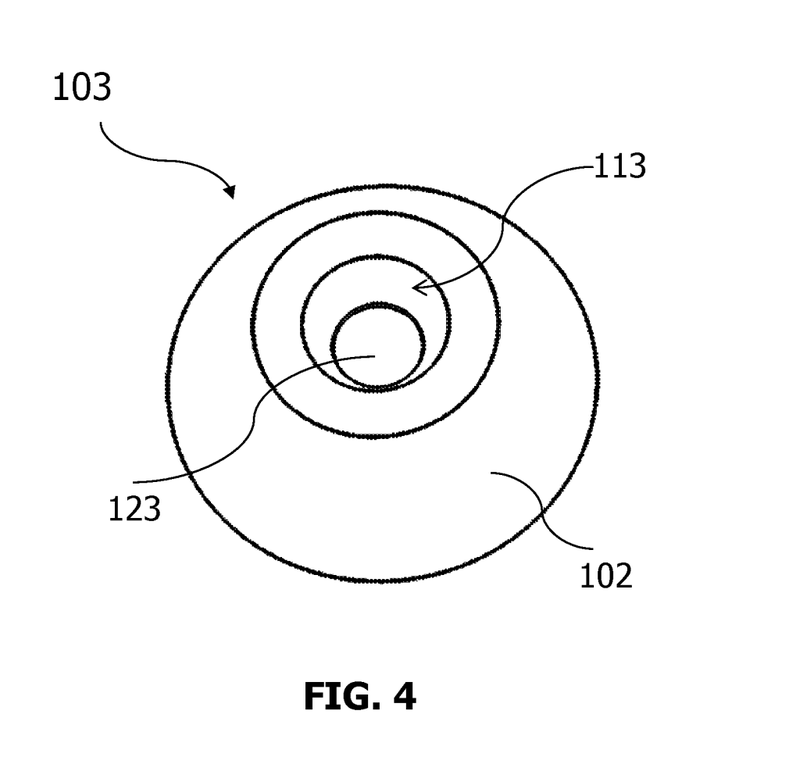
FIG. 4 illustrates a perspective view of the bottom portion of the optical assembly according to the present invention.

Referring to FIG. 4, said bottom portion (103) has an upper wall (123) configured as a concave shaped lens (100) and having an aperture (113) being located on the top of the light source (12).

In another possible embodiment the refractive wall (114) is arranged as Bezier shape which has a plurality of continuous Bezier curve segments each defined by Bezier curve.

Figure 5:
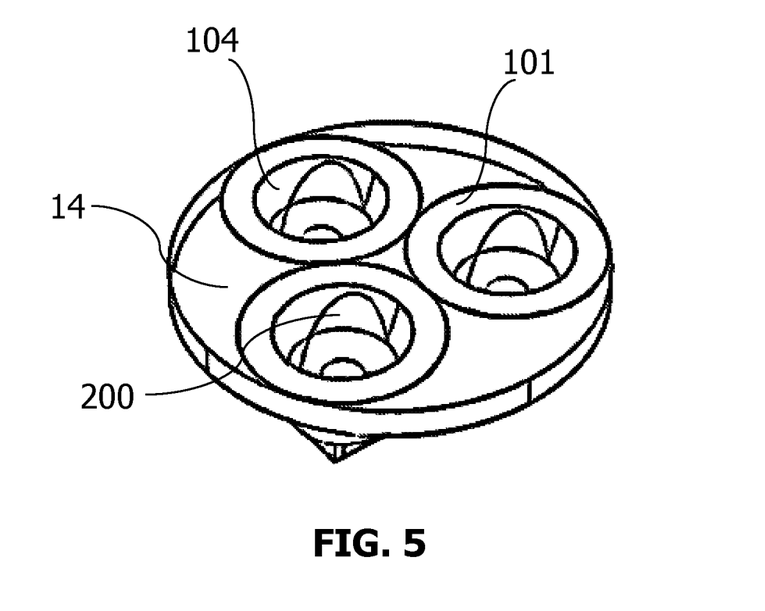
FIG. 5 illustrates an upper perspective view of the optical assembly and the retaining plate according to the present invention.
Figure 6:
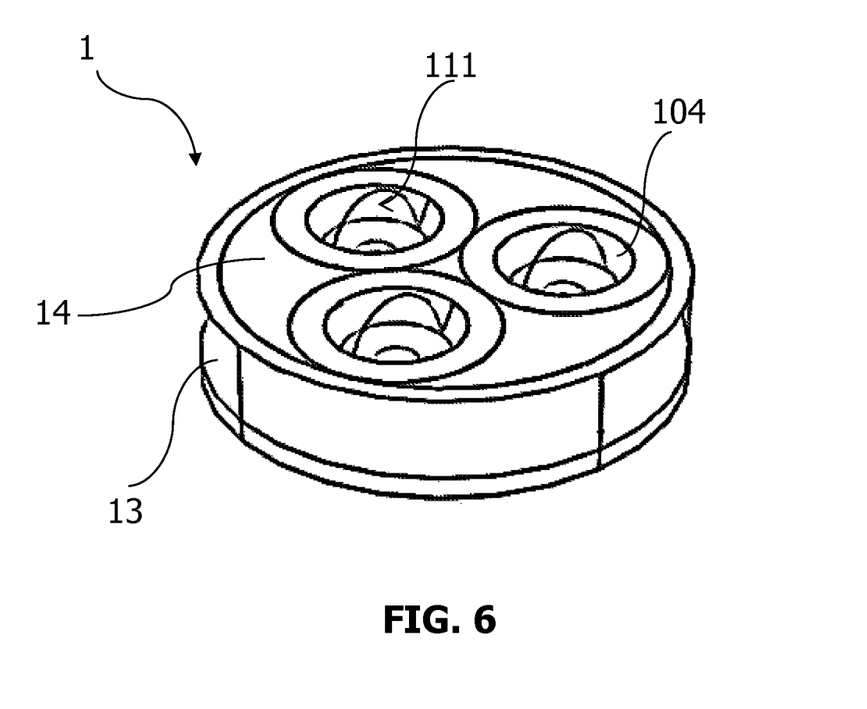
FIG. 6 illustrates the lamp comprising an optical assembly, a light source, a retaining plate, and a casing according to the present invention.

In an optional embodiment, the light source (12) comprises one or more LEDs, preferably three LEDs as illustrated in FIG. 6. In accordance with said embodiment, the retaining plate (14) includes three openings (141) as shown in FIG. 5.

Figure 7:
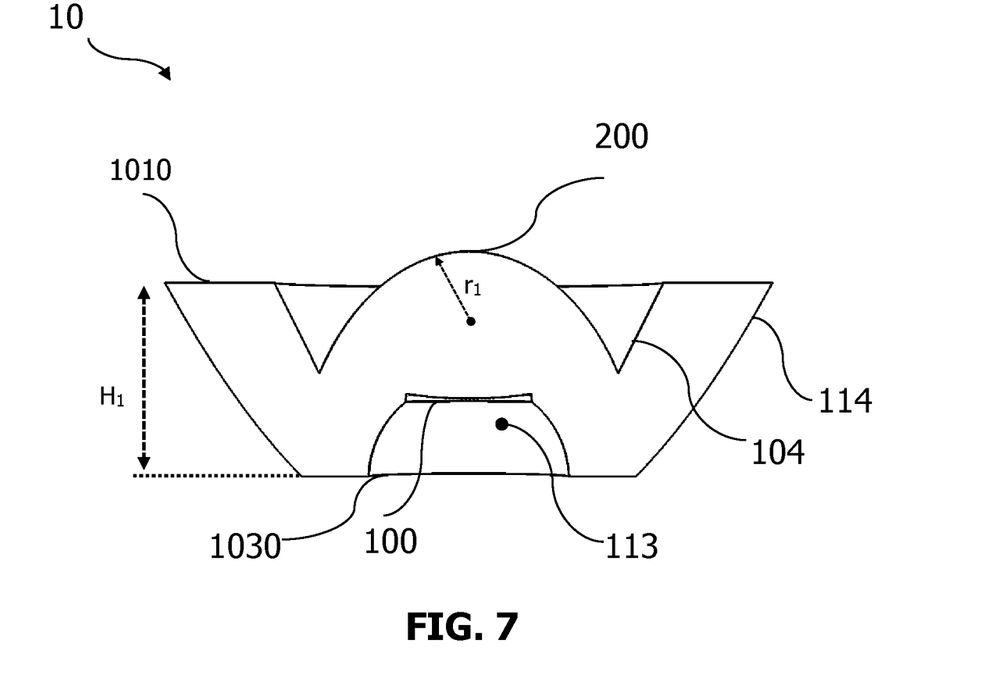
FIG. 7 illustrates a cross-sectional view of the optical assembly according to the present invention.
Figure 8:
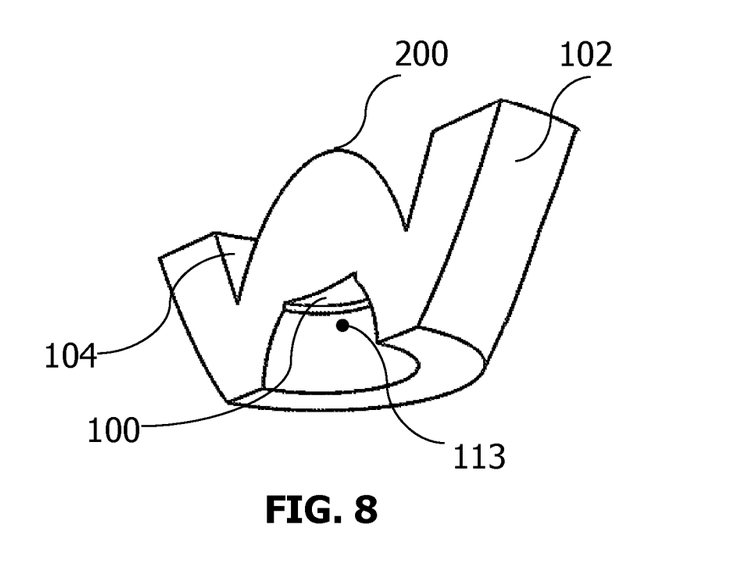
FIG. 8 illustrates a perspective cross-sectional view of the optical assembly according to the present invention.

FIG. 7 and FIG. 8 illustrate the concave-shaped lens (100) and the convex-shaped lens (200) are configured as conic lenses.

Figure 10:
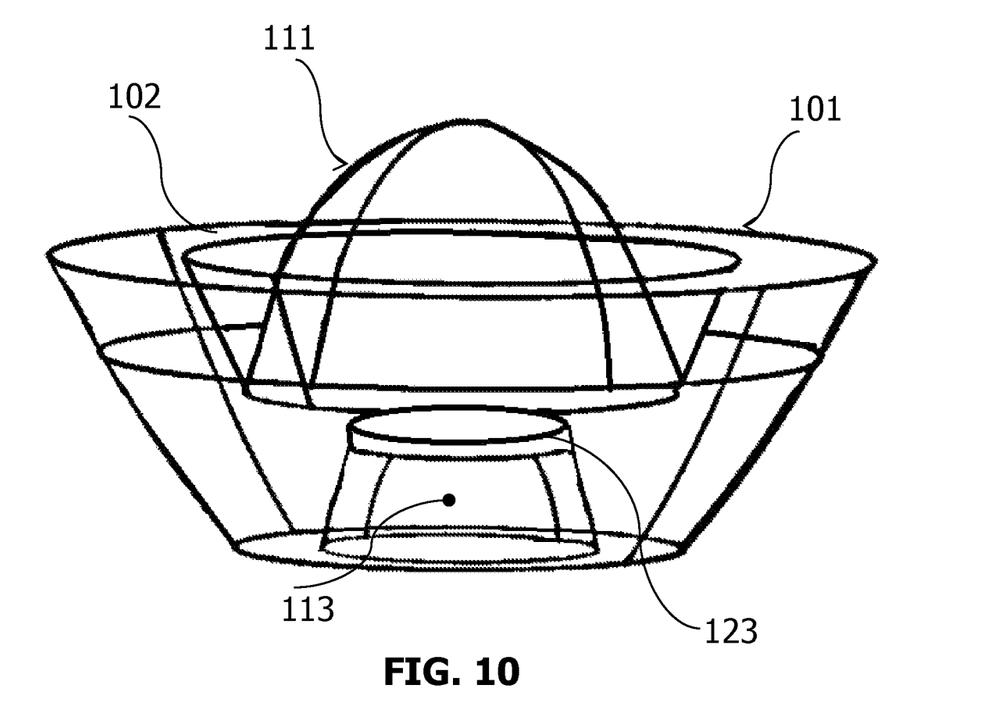
FIG. 10 illustrates another perspective view of the upper portion comprising a convex shaped lens, the bottom portion comprising the aperture and the concave shaped lens in accordance with an embodiment of the to the present invention.

Referring to FIG. 10, in accordance with another optional embodiment, the aperture (113) which is arranged in the bottom portion (103) is sized and shaped as a hemispherical gap for placing the lens above the LEDs. In a possible embodiment, said aperture (113) is configured as a truncated dome shape cavity.

Figure 11:
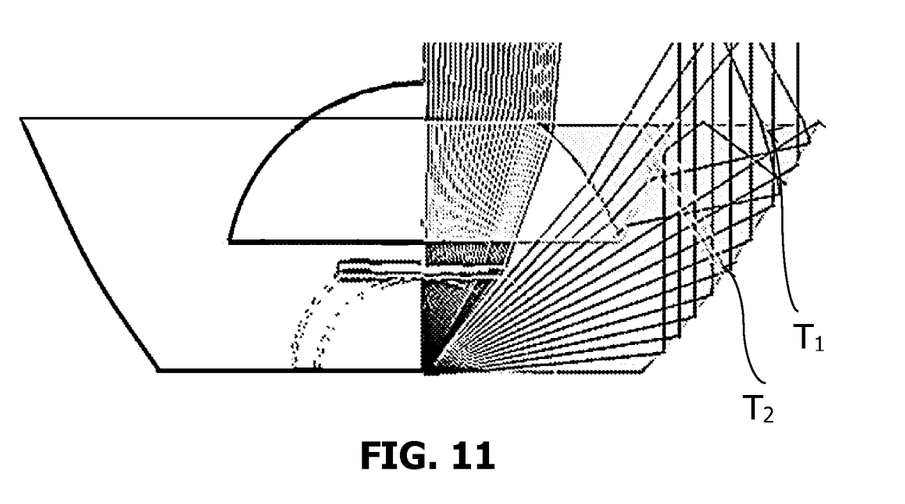
FIG. 11 shows a working principle of the invention according to the present invention.

As can be seen from FIG. 11, the working principle of the invention may be summarized as follows.: Lateral rays (T1) are collimated by the refractive wall (114) which have a TIR effect of Bezier shape of the lens in the sidelong. Centered rays are collimated using the convex-shaped lens (200) and the concave shaped lens surfaces (100). Fractions of rays that are diverged from the desired direction are indicated as lost rays (T2).

A ray-tracing example shows that the optical assembly (10) (i.e. lens) successfully collimates rays in the desired direction resulting in parallel and tidy ray emission in the perpendicular direction. On the contrary, in absence of a proper lens, rays propagate in a random direction in a wide angle.

In an exemplary embodiment of the invention, the lamp (1) includes an MR lens array, a metal core printed circuit board (MCPCB) substrate, a physical frame with heatsink, and a driver circuit. Said embodiment is configured as an MR16 LED lamp (1).

Traditional MR16 lenses of the market come in height of 6 mm or higher. Considering lenses are often composed of UV-stabilized clear polycarbonate with a low thermal conductivity of 0.19 to 0.22 W/m-K, developing a thinner lens can diminish the thermal resistance introduced by MR lenses in accordance with an exemplary embodiment.

With reference to FIG. 7, preferably, the optical assembly (10) has a height (H1) between a top surface (1010) of the upper portion (101) and a base (1030) of the bottom portion (103) wherein said height (H1) is not lower than 2.8 mm and not higher than 4 mm. Therefore, an optical lens with 50% reduced thickness compared to commercially available lenses used in MR16 packages is produced in a variety that exhibits nearly the same light extraction efficiency and more uniform beam angles.

In a possible embodiment of the invention, the height ($H_1$) of the optical assembly (10) (i.e. lens) is 3 mm. Said optical assembly (10) presents a similar optical behavior while its volume is 25% smaller than commercially available lenses.

Figure 9:
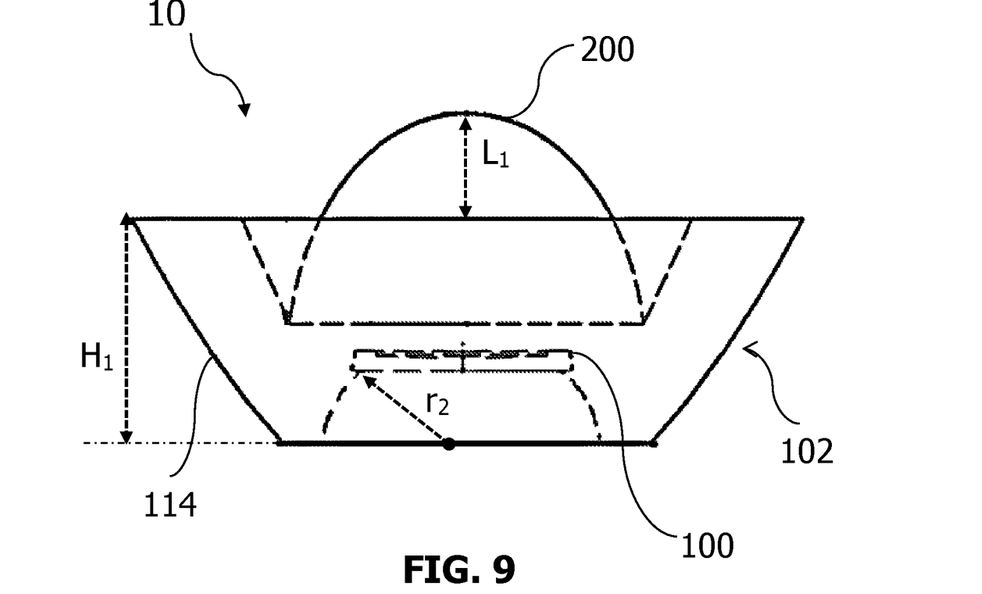
FIG. 9 illustrates the geometrical parameters such as $H_1$, $L_1$ and $r_2$ of the optical assembly.

In another possible embodiment, referring to FIG. 9, the ratio between the height ($H_1$) and the length ($L_1$) of the vertical section of the convex-shaped lens (200) is a value in a range of 1.02 to 1.07. In an optional embodiment, a curvature radius ratio ($r_1/r_2$) between the curvature radius ($r_1$) of the convex-shaped lens (200) and the curvature radius ($r_2$) of the concave-shaped lens (100) is a value in a range of 1.7 to 1.9. Thus lateral rays coming from the light source (12) are collimated by the refractive wall (114) via the TIR effect of the Bezier shape and additionally centred rays are collimated using these two conic lenses without an optical loss.

Using thinner lenses that have a size reduction of more than 25% can reduce the lens and chip temperature, which can result in improved light quality and lifetime of both lens and light source. Having a thinner lens can diminish the thermal resistance introduced by MR lenses.

Figure 12:
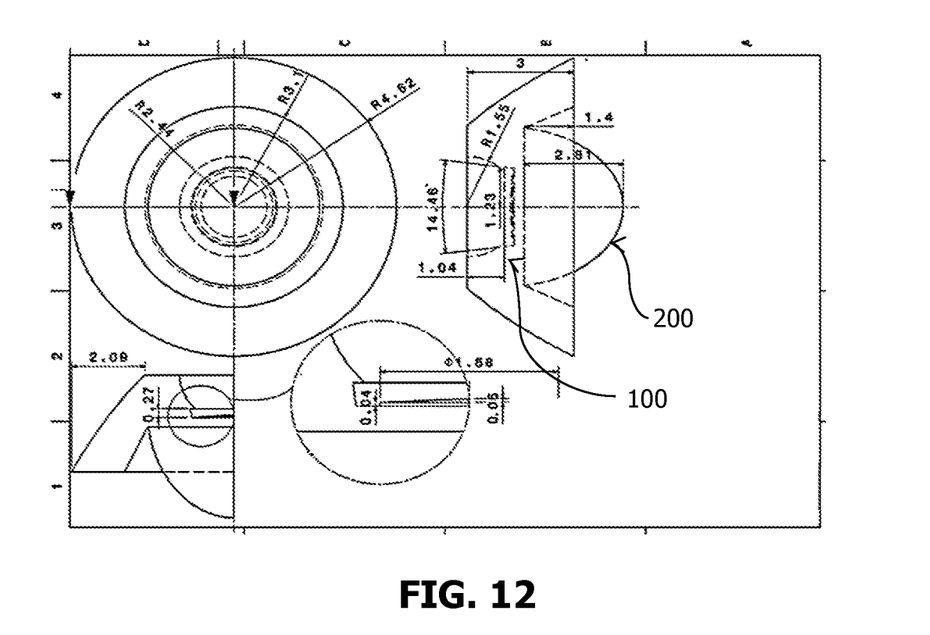
FIG. 12 shows the geometrical parameters of the optical assembly in accordance with the invention.
Figure 13:
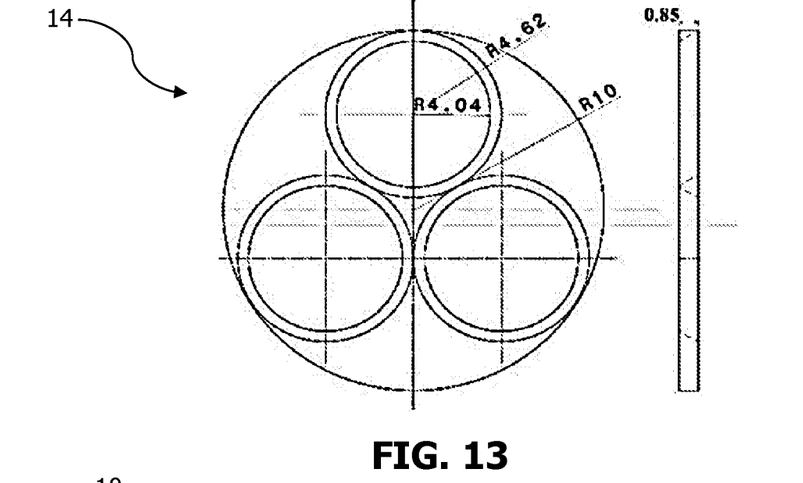
FIG. 13 shows the geometrical parameters of the retaining plate having three openings in accordance with the invention.
Figure 14:
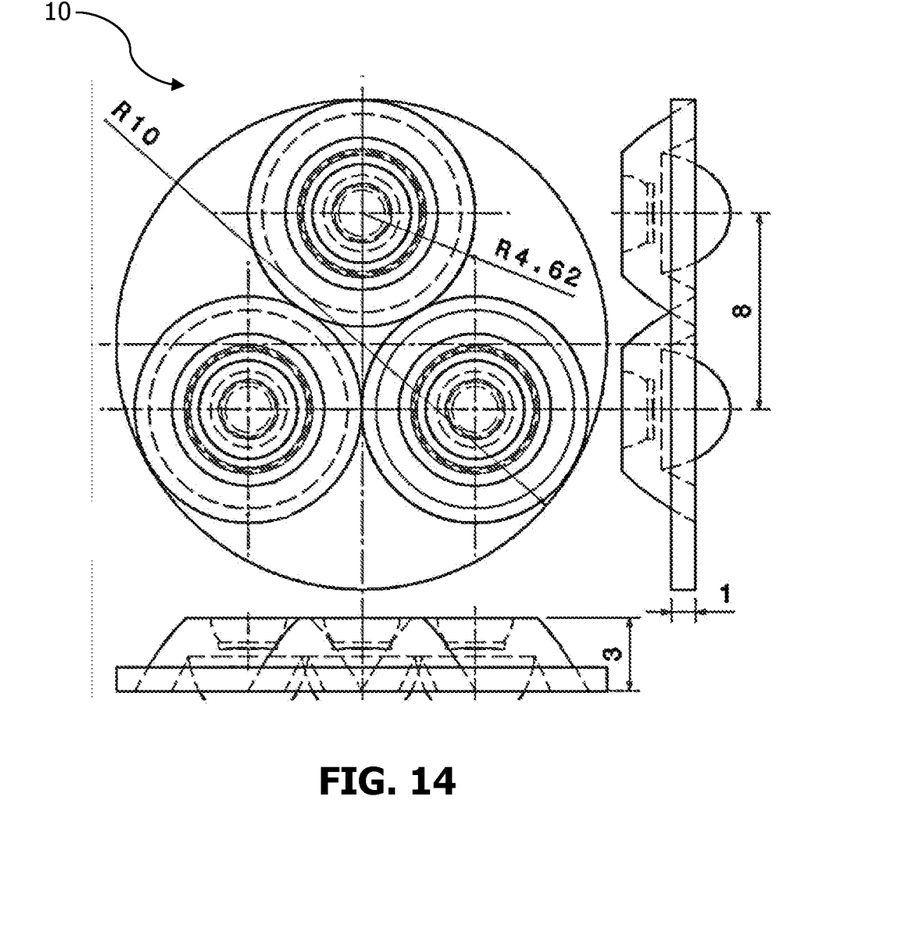
FIG. 14 shows the geometrical parameters of the optical assembly in accordance with the invention.

Two exemplary embodiments of the invention including one LED and three LEDs are illustrated in FIG. 12, FIG. 13, and FIG. 14, respectively. Moreover, the geometrical parameters of the lamp (1) (e.g. M16 lamp) are presented. To obtain maximized peak intensity, the geometrical optimization process is performed in software. In accordance with said embodiment, the optical assembly (10) is a total internal reflection (TIR) multifaceted reflector (MR) lens having a 3 mm thickness.

The present invention is the thinnest light collimation lens configuration available, offering 50% slimmer design, and 25% less material usage, giving desired optical results similar to available commercial lenses. Noteworthy light collimation in 15° and better thermal performance is achieved by the optical assembly (10).

Exemplary Simulations for Proof of Concept

In the scope of the invention, the effect of lens thickness and height (H1) of optical assembly (10) is modeled and optimized in Monte-Carlo ray-tracing simulations performed. Optical results of simulations are compared to experimental data gathered from a spectroradiometer and a goniophotometer.

Figure 15:
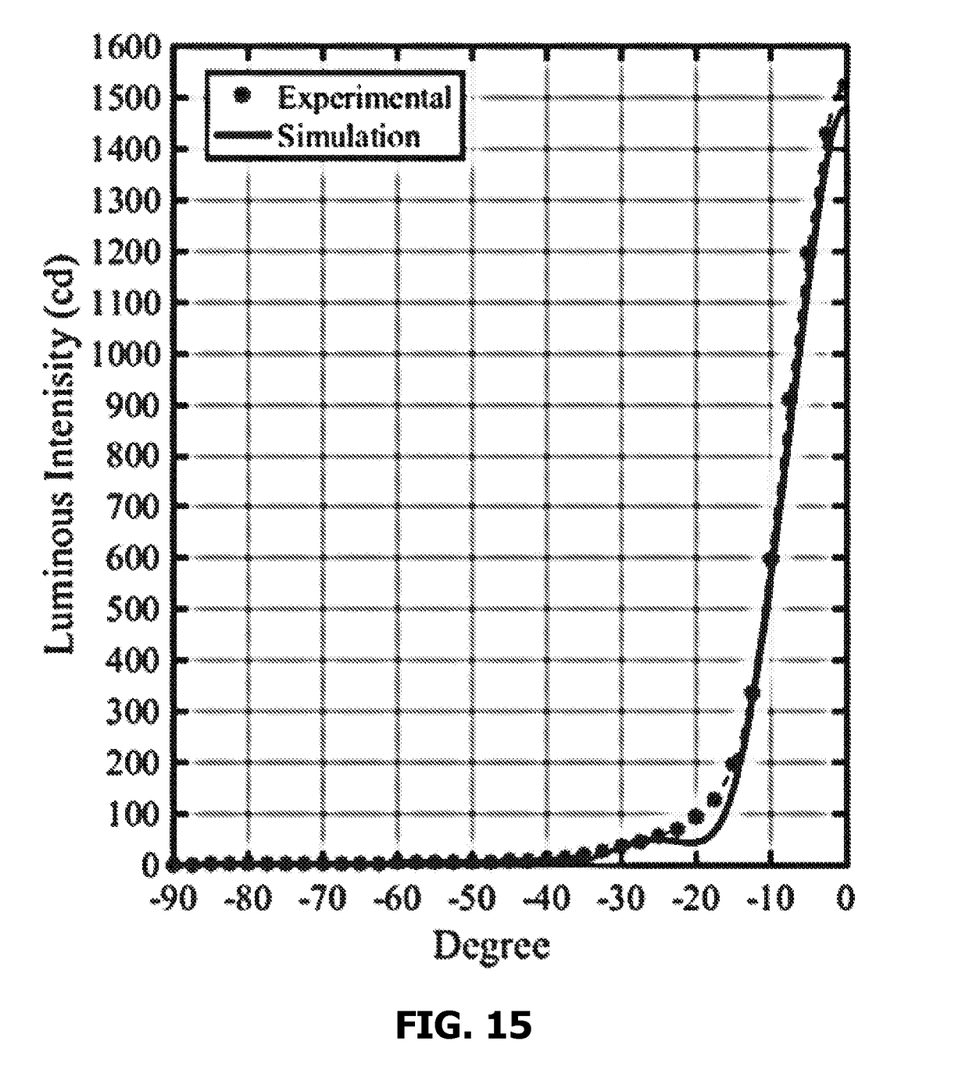
FIG. 15 shows the luminous intensity comparison of the invention and a commercially available MR16 lens in accordance with the invention.

FIG. 15 shows a comparison of luminous intensity between the invention (i.e. a thin lens (3 mm)) and a commercially available thicker lens (6 mm). Optical comparison with commercially available MR16 package shown that the invention exhibits 3.5% higher CRI (color rendering index) and 1.5% higher CCT (correlated color temperature) values.

So as to find out the effect of using a thinner lens on the thermal performance of MR16 packaging, the conduction equation is solved in three-dimensional steady-state FEM simulations.

CAD models of the MR16 with the invented optical assembly (10) and conventional lens are created and thermal comparison is performed to acquire a thermal map on effect of second optics in thermal management of LED packaging. The detailed CAD design of the optical and conventional lens packaging is drawn up whilst for both cases, the same heat sink is considered. Exposed surfaces including the top aluminum cap and the top surface of the lens are adjusted to have convective heat transfer coefficient of the hot surface facing downward. Since the heat sink is located in a recess in the surrounding wall or surface, the heat sink and surfaces are configured to convective heat transfer boundary conditions with a low heat transfer coefficient of 3 W/m²-K.

Figure 16:
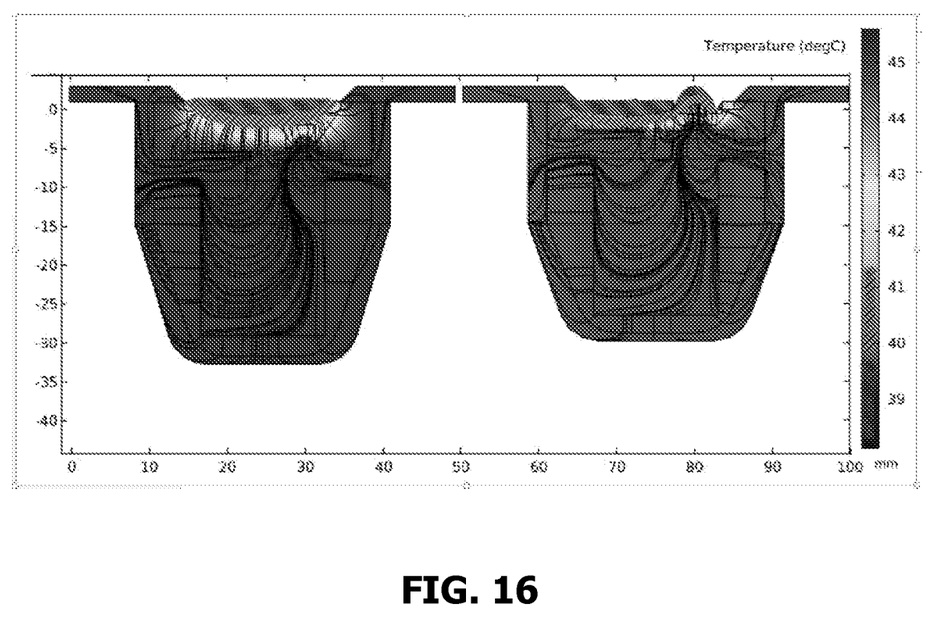
FIG. 16 shows a 2D temperature profile in accordance with the invention.

FIG. 16 illustrates a 2D temperature profile about heat streamlines and heat transfer. The maximum chip temperature in optical assembly (10) is recorded at 45.07° C. while in a conventional package this value is 45.6° C. since less air is trapped between the lens and the board. Although the main heat transfer path is through the aluminum package, a thinner lens (e.g. 3 mm) enhances the heat passage at the top of the package, where the invention accomplishes 28.5 percent more heat transmission to the ambient air Several advantages of the invention compared to the available ones can be listed as follows:

The invention employs 25% less material and has a 21% smaller surface area.

The optical assembly (10) has a 50% thinner structure and presents a similar optical behavior while its volume is 25% smaller than available lenses.

Using the optical assembly (10) as a thinner lens improves the thermal performance of LED packaging since the invention reduces the thermal resistance barrier.

The optical assembly (10) results in more compact packaging designs, allowing for higher lumen and better light quality-controlled products.

More compact package design is obtained by using the optical assembly (10).

The optical assembly (10) offers lower production cost and can be embedded to previously design packages without altering heat sink design.

The optical assembly (10) improves the overall lens performance and increases its life cycle.

What is claimed is:

1. A lamp for producing a collimated light beam, comprising:
    at least one light source disposed on a casing,
    a retaining plated having at least one opening for accommodating an optical assembly,
    the optical assembly comprising an upper portion having a convex shaped lens, and
    a bottom portion having an upper wall configured as a concave shaped lens and having an aperture, wherein the aperture is located on a top of the light source;
    wherein the optical assembly further comprises an inverted dome shaped shell defined by lateral walls and a refractive wall and comprises a domed portion having the convex shaped lens extending outwardly from the lamp, and
    a curvature radius ratio (r1/r2) between a curvature radius (r1) of the convex shaped lens and a curvature radius (r2) of the concave shaped lens is a value in a range of 1.7 to 1.9.

2. The lamp according to claim 1, wherein the optical assembly have a height between a top surface of the upper portion and a base of the bottom portion, wherein the height is not lower than 2.8 mm and not higher than 4 mm.

3. The lamp according to claim 2, wherein a ratio of the height and a length of a vertical section of the convex shaped lens is a value in a range of 1.02 to 1.07.

4. The lamp according to claim 3, wherein the upper portion of the optical assembly comprises a plurality of cutouts.

5. The lamp according to claim 3, wherein the refractive wall has a plurality of continuous Bezier curve segments each defined by Bezier curve.

6. The lamp according to claim 3, wherein the concave shaped lens and the convex shaped lens are configured as conic lenses.

7. The lamp according to claim 2, wherein the height between the top surface of the upper portion and the base of the bottom portion is 3 mm.

8. The lamp according to claim 7, wherein the upper portion of the optical assembly comprises a plurality of cutouts.

9. The lamp according to claim 7, wherein the refractive wall has a plurality of continuous Bezier curve segments each defined by Bezier curve.

10. The lamp according to claim 7, wherein the concave shaped lens and the convex shaped lens are configured as conic lenses.

11. The lamp according to claim 2, wherein the upper portion of the optical assembly comprises a plurality of cutouts.

12. The lamp according to claim 2, wherein the refractive wall has a plurality of continuous Bezier curve segments each defined by Bezier curve.

13. The lamp according to claim 2, wherein the concave shaped lens and the convex shaped lens are configured as conic lenses.

14. The lamp according to claim 1, wherein the upper portion of the optical assembly comprises a plurality of cutouts.

15. The lamp according to claim 14, wherein the refractive wall has a plurality of continuous Bezier curve segments each defined by Bezier curve.

16. The lamp according to claim 14, wherein the concave shaped lens and the convex shaped lens are configured as conic lenses.

17. The lamp according to claim 1, wherein the refractive wall has a plurality of continuous Bezier curve segments each defined by Bezier curve.

18. The lamp according to claim 17, further comprising more than one LEDs, an MR lens array, a metal core printed circuit board substrate and a frame with an attached heatsink.

19. The lamp according to claim 1, wherein the concave shaped lens and the convex shaped lens are configured as conic lenses.

20. The lamp according to claim 1, wherein the optical assembly is a total internal reflection (TIR) multifaceted reflector (MR) lens having a 3 mm thickness.

* * * * *